3,590,013
SELF-EXTINGUISHING ALKENYL AROMATIC
POLYMERS WITH UNIFORM PORE STRUCTURE
Horst Jastrow and Michael Lederer, Frankfurt am Main,
and Horst Schnable, Hofheim, Taunus, Germany, assignors to Farbwerke Hoechst Aktiengesellschaft vormals Meister Lucius & Bruning, Frankfurt am Main, Germany
No Drawing. Filed May 2, 1969, Ser. No. 821,462
Claims priority, application Germany, May 8, 1968,
P 17 69 320.8
Int. Cl. C08f 45/60, 47/10, 7/04
U.S. Cl. 260—2.5                                                3 Claims

ABSTRACT OF THE DISCLOSURE

The invention relates to self-extinguishing foamable alkylene aromatic polymers containing a foaming agent, an aliphatic bromine compound and 0.2 to 1% by weight of a N.O-acetidinone peroxyacetal.

The present invention relates to self-extinguishing alkenyl aromatic polymers with uniform pore structure.

It has been proposed to introduce compounds containing chlorine and bromine in thermoplastic compositions as flame-proofing agents. Aliphatic bromine compounds have proved to be more effective than chlorine compounds. However, 3 to 5% by weight of the bromine compounds are necessary for rendering styrene polymers flame-proof. By the addition of peroxides having a synergistic effect the amount of bromine compound needed can be reduced. In U.S. Pat. 3,304,332 peroxides containing bromine have been proposed as flame-proofing substances. It has also been proposed to add an indigo compound which may be halogen-substituted, to a polystyrene extrusion foam rendered flame-proof by the addition of 1 to 3% by weight of tetrabromobutane to impart to the foam expanded with methyl chloride a finer cellular structure.

Now, we have found that alkenyl aromatic polymers containing foaming agents and having a content of at least 50% of styrene in polymerized form, after having been foamed to form a cellular polymer mass, have a homogeneous cell structure and are flame-proof, if they contain, in addition to 0.2 to 1.0% by weight of an aliphatic bromine compound, 0.2 to 1.0% by weight of N.O-acetidinone peroxyacetal of the following formula

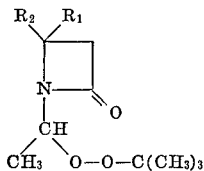

in which $R_1$ and $R_2$ stand for alkyl groups containing 1 to 4 carbon atoms or for phenyl groups.

By alkenyl aromatic polymers there are to be understood the polymers of styrene, α-methyl styrene, vinyl toluene and halogenated vinyl benzenes and/or copolymers of these compounds with acrylonitrile, acrylic acid esters and methacrylic esters. The self-extinguishing foams may also contain finely divided, rubber-like polymers, for example polybutadiene or polyisoprene.

Suitable aliphatic bromine compounds preferably contain at least 40% by weight of bromine linked to aliphatic carbon atoms. There may be used, for example, 1,2,3,4-meso-tetrabromobutane, 2,2,3,3-tetrabromobutane, 1,2-dibromostyrene, tetrabromocyclododecane, hexabromocyclododecane, hexabromocyclohexane and brominated polybutadienes. Combinations of several bromine compounds may also be used, in which case the total amount of the bromine compounds should correspond to about the amount of the N,O-acetidinone peroxyacetal used.

The polymers may contain other components, for example fillers, dyestuffs, lubricants, stabilizers and antistatic agents.

Suitable foaming agents are liquid organic compounds which do not dissolve the polymer and the boiling point of which is below the softening point of the polymer. There may advantageously be used, for example, aliphatic hydrocarbons having 1 to 7 carbon atoms as n-pentane and cyclopentane, butane and iso-hexane. 4 to 12% by weight of a foaming agent calculated on the polymer is advantageously used.

The N,O-peroxyacetals may be obtained by the reaction of N-vinyl-acetidinones with alkyl hydroperoxides in the presence of acid halides as catalysts.

For manufacturing the flame-proof polymer foams having regulated pores, single compounds or a mixture of the compounds according to the invention may be used. The addition of the N,O-acetidinone peroxyacetals is carried out either by admixing the compound to the monomer before the polymerization or by adding it together with the foaming agent during the polymerization of the vinyl monomers.

The impregnation of sieved fractions of alkenyl aromatic polymers, for example polystyrene, in an aqueous suspension under pressure at an elevated temperature with mixtures of n-pentane, aliphatic bromine compounds and the compounds according to the invention also yields polymers containing foaming agents which can be used for the manufacture of self-extinguishing foams. It is then, however, difficult to make the pore regulation reproducible.

The following examples serve to illustrate the invention, but are not intended to limit it.

EXAMPLES

The test for the flame resistance was carried out by the Schramm-Zebrowski method.[1] Foamed test specimens of 15 x 5 x 1.3 centimeters were pressed against a fixed Silit glow-bar, the temperature of which was regulable within the range of from 300 to 1200° C. The contact time was 10 seconds. First, the ignition time, calculated on a glowing body, was determined. If the test specimen was extinguished when being withdrawn carefully, the time needed for extinguishing was stopped and the test repeated at a higher temperature. The tests were carried out in a fume hood free from draft with closed air-valves and switched off ventilator.

The pore structure of foamed beads was examined visually on thin sections. Beads of the same pourability were compared; the pre-foaming was carried out with polymers having the same age, the same content of foaming agent and the same medium molar weight. If in the thin section the medium diameter ratio (ratio of the smallest diameter to the medium diameter) of the polygons was greater than 1:3, the test specimen was classified ---
[1] DiN 53459, but with a contact time of 10 sec.

as having an irregular pore structure, if the ratio was smaller than 1:3, the products were classified as being uniform.

(1) In an 80 liter vessel, 25 kilograms of $H_2O$ and 25 kilograms of styrene were polymerized at 85° C. with polyvinyl alcohol as suspension stabilizer in the presence of 6% by weight of n-pentane; m-tetrabromobutane (TBB); 0.2% by weight of dibenzoyl peroxide and 4,4-dimethyl - N - (1-yl-1-tert.butyl-peroxi-ethyl)-acetidinone properties shown in the following Table 1:

TABLE 1

| Reaction mixture | Percent of m-TBB | Percent of compound A | Pore structure | Ignition temperature, °C | Extinction time, seconds |
|---|---|---|---|---|---|
| a | 0 | 0 | Irregular | 750 | (a) |
| b | 1.0 | 0 | do | 775 | (a) |
| c | 1.0 | 1.0 | Uniform | 1,000 | (b) |
| d | 0.7 | 0.75 | do | 1,000 | 1 |
| e | 0.5 | 0.5 | do | 1,000 | 2 |
| f | 0.2 | 0.2 | do | 975 | 2 | a Keeps burning.
b Instantly (<1).

Comparison tests were carried out with dicumyl peroxide (compound B) and with 2,3-dibromopropyl-tert. butyl peroxide (compound C). The following Table 2 shows that foams containing the compounds B and C have poorer self-extinguishing properties and a poorer pore structure than those containing the synergists according to the invention:

TABLE 2

| Reaction mixture | Percent of m-TBB | Percent of compound | Pore structure | Ignition temperature, °C | Extinction time, seconds |
|---|---|---|---|---|---|
| g | 0.5 | (B) 0.5 | Irregular | 900 | (a) |
| h | 0.75 | (B) 0.75 | do | 950 | 3 |
| i | 0.5 | (C) 0.5 | do | 900 | 5 |
| j | 0.75 | (C) 0.75 | do | 900 | 12 |
| k | 1.0 | (C) 1.0 | do | 950 | 2 | a Keeps burning.

(2) In a manner analogous to Example 1 styrene was polymerized with 25% by weight of acrylonitrile and during the polymerization 4,4-dipropyl-N-(1-yl-1-tert. butyl-peroxi-ethyl)-acetidinone (compound D) dissolved in n-pentane was added. The following Table 3 shows the properties obtained:

TABLE 3

| Reaction mixture | Percent of m-TBB | Percent of compound D | Pore structure | Ignition temperature, °C | Extinction time, seconds |
|---|---|---|---|---|---|
| l | 0.5 | 0.5 | Uniform | 1,000 | 2 |
| m | 0.7 | 0.7 | do | 1,000 | 1 |
| n | 1.0 | 1.0 | do | 1,000 | (a) | a Instantly (<1).

What we claim is:
1. A foamable alkenyl aromatic polymer having a content of at least 50% styrene in polymerized form and containing 4 to 12% by weight of a foaming agent, 0.2 to 1.0% by weight of an aliphatic bromine compound and 0.2 to 1.0% by weight of a N,O-acetidinone peroxyacetal of the following formula:

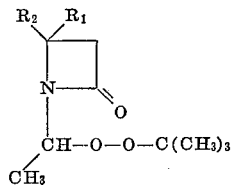

in which $R_1$ and $R_2$ stand for alkyl groups having 1 to 4 carbon atoms or phenyl groups.

2. A self-extinguishing foamable alkylene aromatic polymer having a content of at least 50% styrene in polymerized form comprising
(A) a polymer of styrene, α-methyl styrene, vinyl toluene or halogenated vinylbenzene copolymers of these compounds with acrylonitrile, acrylic acid esters or methacrylic acid esters,
(B) 0.2 to 1% by weight of an aliphatic bromine compound and
(C) 0.2 to 1% by weight of a N,O-acetidinone peroxyacetal of the formula:

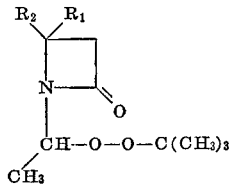

in which $R_1$ and $R_2$ stand for alkyl groups having 1 to 4 carbon atoms or phenyl groups.

3. A self-extinguishing expanded thermoplastic article comprising a foamed cellular alkylene aromatic polymer having a content of at least 50% styrene in polymerized form containing 0.2 to 1% by weight of an aliphatic bromine compound and 0.2 to 1% by weight of a N,O-acetidinone peroxyacetal of the formula:

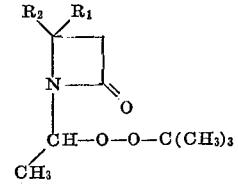

in which $R_1$ and $R_2$ stand for alkyl groups having 1 to 4 carbon atoms or phenyl groups.

References Cited
UNITED STATES PATENTS 3,058,929 10/1962 Vanderhoff et al. _ 260—2.5(FP)
3,274,133 9/1966 Ingram _____ 260—2.5(FP)
3,338,864 8/1967 Mageli et al. _____ 260—2.5(FP)

MURRAY TILLMAN, Primary Examiner
W. J. BRIGGS, SR., Assistant Examiner

U.S. Cl. X.R.
260—33.6, 45.8, 85.5, 86.7, 88.1, 93.5, 239, 892